(12) United States Patent
Abe

(10) Patent No.: US 6,774,626 B2
(45) Date of Patent: Aug. 10, 2004

(54) DEVICE AND METHOD FOR MEASURING THE PROPERTIES OF A MAGNETIC REPRODUCING HEAD

(75) Inventor: Masayuki Abe, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 535 days.

(21) Appl. No.: 09/835,547

(22) Filed: Apr. 17, 2001

(65) Prior Publication Data

US 2002/0021515 A1 Feb. 21, 2002

(30) Foreign Application Priority Data

Aug. 21, 2000 (JP) ........................................ 2000-249324

(51) Int. Cl.[7] .............................................. G01R 33/12
(52) U.S. Cl. ...................................................... 324/210
(58) Field of Search ........................... 360/31; 324/210, 324/232, 244, 263, 212

(56) References Cited

U.S. PATENT DOCUMENTS

| | | | | |
|---|---|---|---|---|
| 5,721,488 A | * | 2/1998 | Sakai et al. .................. | 324/210 |
| 5,918,274 A | * | 6/1999 | Chen et al. .................... | 73/105 |
| 6,094,971 A | * | 8/2000 | Edwards et al. .............. | 73/105 |
| 6,437,562 B2 | * | 8/2002 | Abe ............................. | 324/210 |
| 6,605,941 B2 | * | 8/2003 | Abe ............................. | 324/244 |
| 6,617,848 B2 | * | 9/2003 | Abe ............................. | 324/210 |
| 6,639,400 B2 | * | 10/2003 | Abe ............................. | 324/210 |

FOREIGN PATENT DOCUMENTS

JP      2000-20929      1/2000

OTHER PUBLICATIONS

Ohmori, Techniques for Analysis of Magnetic Recording Heads and Magnetoresistive Heads, Journal of Japanese applied magnetism institution, 1999, pp. 2111–2117, vol. 23, No. 12.

Sueoka et al., Direct Measurement of the Sensitivity Distribution of Magnetoresistive Heads by the SXM Technique, IEEE Transactions on Magnetics, Sep. 1992, pp. 2307–2309, vol. 28, No. 5.

Gibson et al., Spatial Mapping of the Sensitivity Function of Magnetic Recording Heads Using a Magnetic Force Microscope as a Local Flux Applicator, IEEE Transactions on Magnetics, Sep. 1992, pp. 2310–2311, vol. 28, No. 5.

* cited by examiner

Primary Examiner—David Hudspeth
Assistant Examiner—Daniell L Negroń
(74) Attorney, Agent, or Firm—Pillsbury Winthrop LLP

(57) ABSTRACT

A device for measuring a magnetic property of a magnetic reproducing head at a measurement point thereon, the device which applies a first magnetic field which oscillates at a predetermined oscillation frequency to the measurement point, applies a second magnetic field of which strength changes slower compared with the oscillation frequency of the first magnetic field to the measurement point, detects a signal generated by the magnetic reproducing head according to the total strength of the first magnetic field and the second magnetic field, extracts amplitude components synchronizing with the oscillation frequency from the signal, and calculates changes of the signal against the total magnetic field strength based on the extracted amplitude components.

28 Claims, 4 Drawing Sheets

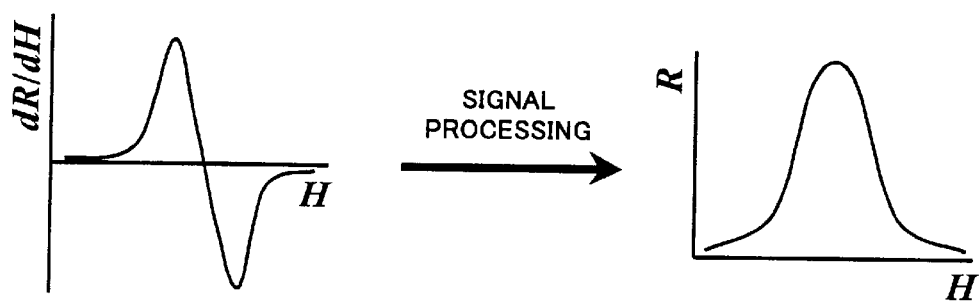
*Fig. 4(a)*          *Fig. 4(b)*

DEVICE AND METHOD FOR MEASURING THE PROPERTIES OF A MAGNETIC REPRODUCING HEAD

FIELD OF THE INVENTION

The present invention relates to a device and method for measuring the properties of a magnetic reproducing head that reads data from a data recording medium. The present invention, more particularly, relates to a device and method for measuring a local magnetic property of a magnetic reproducing head.

BACKGROUND AND MATERIAL INFORMATION

A magnetic reproducing head is a device to read data stored in a magnetic disk mounted in a disk storage unit, for example. Conventionally, operating characteristics of the magnetic reproducing head are evaluated by actually reading the data from the magnetic disk after the head is mounted in the disk storage unit. However, with the increase of magnetic density in a magnetic disk, a magnetic reproducing head has been downsized in recent years. As a result, it has become more difficult to check the quality of the magnetic reproducing head according to a conventional method of measuring operating characteristics.

In consideration of these circumstances, Japanese laid-open patent publication No. 2000-20929 (Tokkai 2000-20929) discloses a device to measure the magnetic property distribution on a measurement surface of a magneto-resistive head (hereinafter referred to as 'MR head'), which is a kind of a magnetic head, applying the principle of an atomic force microscope (hereinafter referred to as 'AFM'). The MR head employs an element having a magneto-resistive effect, electric resistance of which change with the strength of a magnetic field externally applied, as its head.

Originally, the AFM is a device to observe the shape of a microscopic area by scanning the surface of a matter to be observed using a magnetic tip that oscillates at a predetermined amplitude. So, in the Japanese laid-open patent publication, a magnetic element is employed as the tip to measure the magnetic property of the MR head using the AFM.

That is, the magnetic property distribution of the MR head is measured by utilizing the phenomenon in which a magnetic field applied to the MR head by this magnetic tip changes with the tip's oscillation over the surface to be measured. The measurement is executed in a manner shown below:

(1) The MR head is supplied with a constant current from a constant current source.
(2) The magnetic tip oscillating at a specific frequency is brought close to the MR head.
(3) As a value of resistance of the MR head changes with the magnetic field applied by the magnetic tip, a voltage across the MR head changes.
(4) Amplitudes and phases of both fundamental frequency component of the tip's oscillation and its secondary harmonic component are measured by executing a synchronous detection to the voltage across the MR head using a lock-in amplifier.
(5) A distribution of each component is measured by repeating the same synchronous detection all over a measurement surface of the MR head.
(6) Some constant magnetic fields having different strength are applied externally to the MR head and consequently some magnetic property distributions corresponding to the strength of the applied magnetic field are measured.

As described above, the Japanese laid-open patent publication discloses a property measuring device effective in measuring a magnetic property distribution within a measurement surface. However, in order to fully evaluate the operating characteristics of a magnetic reproducing head, it is demanded to measure local magnetic properties within the measurement surface in addition to its magnetic property distribution.

Further, in the property measuring device, an oscillation/amplitude signal of a cantilever is transformed to a signal having a constant amplitude by an automatic gain controller and the transformed signal is supplied to a lock-in amplifier as a reference signal. However, the signal having a constant amplitude is not desirable as the reference signal from the viewpoint of the principle of synchronous detection because a Q factor of this signal is apt to lower due to thermal oscillation of the cantilever.

SUMMARY OF THE INVENTION

Accordingly, the present invention is directed to a device and method for measuring properties of a magnetic reproducing head that substantially obviates one or more of problems due to limitations and disadvantages of the prior art.

In accordance with the purpose of the present invention, as embodied and broadly described, the present invention is directed to a device for measuring a magnetic property of a magnetic reproducing head at a measurement point thereon. The device comprises means for applying a first magnetic field which oscillates at a predetermined oscillation frequency to the measurement point, means for applying a second magnetic field of which strength changes slower compared with the oscillation frequency of the first magnetic field to the measurement point, means for detecting a signal generated by the magnetic reproducing head according to the total strength of the first magnetic field and the second magnetic field, and means for measuring the detected signal's dependency on applied magnetic field strength.

Also in accordance with the present invention, there is provided a device for measuring a magnetic property of a magnetic reproducing head at a measurement point thereon. The device comprises means for applying a first magnetic field which oscillates at a predetermined oscillation frequency to the measurement point, means for applying a second magnetic field of which strength changes slower compared with the oscillation frequency of the first magnetic field to the measurement point, means for detecting a signal generated by the magnetic reproducing head according to the total strength of the first magnetic field and the second magnetic field, means for extracting amplitude components synchronizing with the oscillation frequency from the signal, and means for calculating changes of the signal against the total magnetic field strength based on the extracted amplitude components.

Further in accordance with the present invention, there is provided a device for measuring both a shape property of a measurement surface of a magnetic reproducing head and a magnetic property on a measurement point within the measurement surface. The device comprises a probe at least a part of which is made of a magnetic substance, means for oscillating the probe at a predetermined amplitude in the normal direction to the measurement surface, means for moving the oscillating probe tapping the magnetic reproducing head on the measurement surface at the predetermined amplitude, and discontinuing the moving when the probe is located at the measurement point, means for detecting the probe's displacement in the normal direction to the measurement surface, means for measuring the shape property of the measurement surface based on the probe's displacement detected during the moving, means for applying a magnetic field of which strength changes slower compared with the oscillation frequency of the probe to the measurement surface while the moving is discontinued, means for detecting a signal generated by the magnetic resistive head according to the total strength of the magnetic field both by the magnetic field applying means and by the probe while the moving is discontinued, means for extracting amplitude components synchronizing with the oscillation frequency from the signal, and means for calculating changes of the signal against the total magnetic field strength based on the extracted amplitude components.

Additionally in accordance with the present invention, there is provided a method for measuring a magnetic property of a magnetic reproducing head at a measurement point thereon. The method comprises applying a first magnetic field which oscillates at a predetermined oscillation frequency to the measurement point, applying a second magnetic field to the measurement point, changing the strength of the second magnetic field slower compared with the oscillation frequency of the first magnetic field, detecting a signal generated by the magnetic reproducing head according to the total strength of the first magnetic field and the second magnetic field, measuring the signal's dependency on applied magnetic field strength.

Also in accordance with the present invention, there is provided a method for measuring both a shape property of a measurement surface of a magnetic reproducing head and a magnetic property on a measurement point within the measurement surface. The method comprises oscillating a probe at least a part of which is made of a magnetic substance at a predetermined amplitude in the normal direction to the measurement surface, moving the oscillating probe tapping on the magnetic reproducing head on the measurement surface at the predetermined amplitude, discontinuing the moving when the probe is located at the measurement point, detecting the probe's displacement in the normal direction to the measurement surface, measuring the shape property of the measurement surface based on the probe's displacement detected during the moving, applying a magnetic field to the magnetic reproducing head while the moving is discontinued, changing the strength of the magnetic field slower compared with the oscillation frequency of the probe, detecting a signal generated by the magnetic reproducing head according to the total strength of the magnetic field applied to the head, extracting amplitude components synchronizing with the oscillation frequency from the signal, and calculating changes of the signal against the total magnetic field strength based on the extracted amplitude components.

BRIEF DESCRIPTION OF THE DRAWINGS

The accompanying drawings, which are incorporated in and constitute part of this specification, illustrate various embodiments and/or features of the invention and together with the description, serve to explain the principles of the invention. In the drawings:

FIGS. 4a and 4b are diagrams showing transformation of data measured by the property measuring device consistent with the present invention.

DETAILED DESCRIPTION

Figure 1:
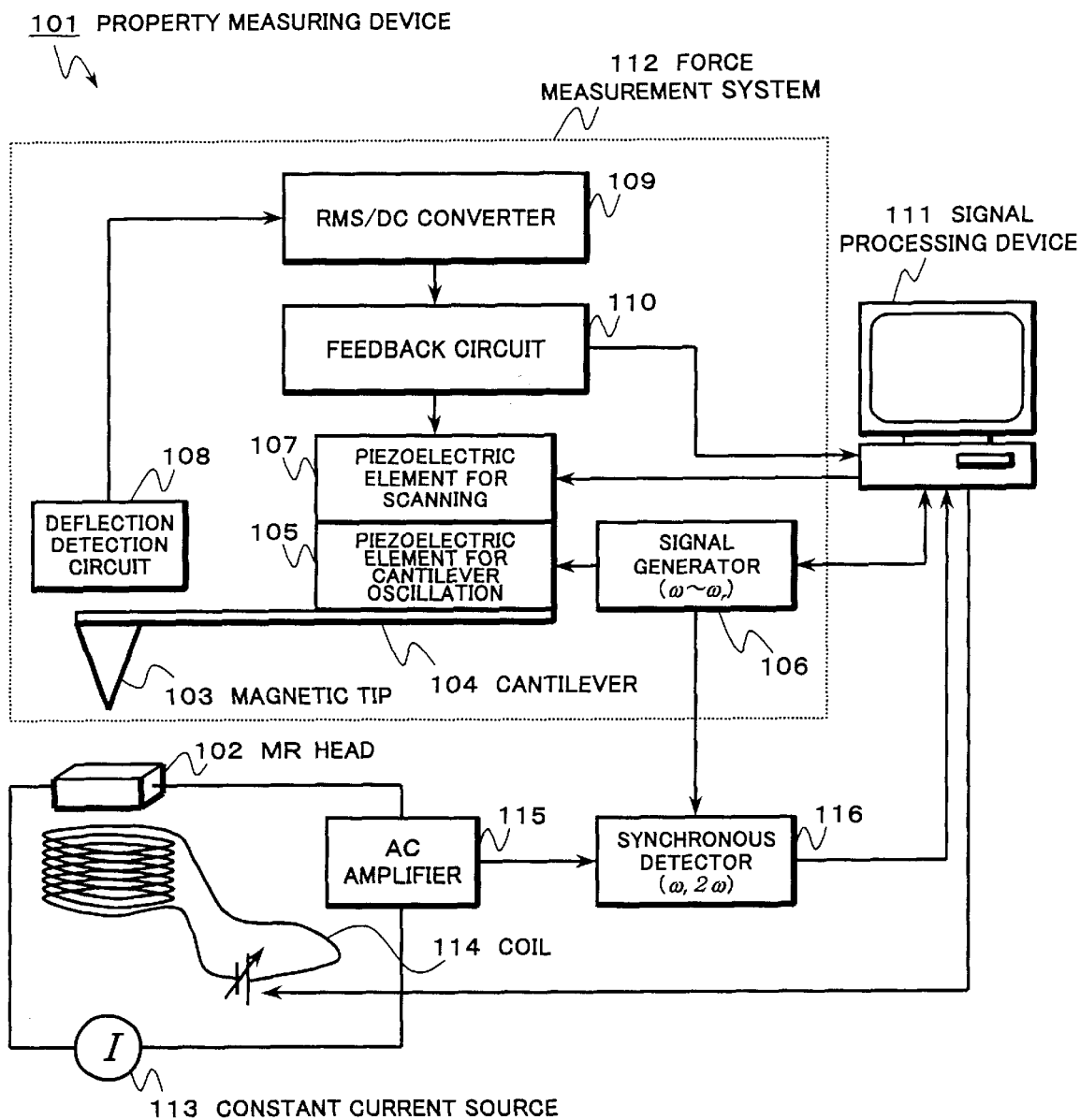
FIG. 1 is a block diagram showing an example of a main configuration of a device for measuring properties of a reproducing head consistent with the present invention.

FIG. 1 is a block diagram showing an example of a main configuration of a device for measuring properties of a reproducing head 101.

In order to measure magnetic property of an MR head 102, which is an example of a magnetic reproducing head, the property measuring device 101 mainly comprises a magnetic tip 103, a cantilever 104, a piezoelectric element for cantilever oscillation 105, a signal generator 106, a piezoelectric element for scanning 107, a deflection detection circuit 108, a root-mean-square/direct current (RMS/DC) converter 109, a feedback circuit 110, a signal processing device 111, a constant current source 113, a coil 114, an AC amplifier 115, and a synchronous detector 116.

The magnetic tip 103 is made of a magnetic material or is magnetized by coating with a magnetic material. The magnetic tip 103 observes the shape of the measurement surface of the MR head 102, namely, its top surface shown in FIG. 1, as a magnetic tip for shape property measurement, by scanning the surface. Moreover, the magnetic tip 103, which is oscillated by the cantilever 104, periodically changes a magnetic field applied to each measurement point located within a measurement surface as a magnetic oscillator for magnetic property measurement.

The cantilever 104, one end of which is connected to the piezoelectric element for cantilever oscillation 105, is oscillated in the normal direction to the measurement surface by the oscillation generated by the piezoelectric element for cantilever oscillation 105. As a result, the magnetic tip 103, which is mounted on the other end of the cantilever 104, is oscillated.

The signal generator 106 supplies the piezoelectric element for cantilever oscillation 105 with a oscillation frequency/amplitude setting signal according to a manipulate signal provided from a signal processing device 111 in order to oscillate the piezoelectric element for cantilever oscillation 105 preferably at a mechanical resonance frequency ω r inherent to the cantilever 104 or at its nearby frequency ω.

The reason why the signal generator 106 directs the piezoelectric element for cantilever oscillation 105 to oscillate at a neighborhood of the frequency ω r is that the cantilever 104 can keep the periodical oscillation stable at around the mechanical resonance frequency ω r. However, even if the can tilever 104 was directed to oscillate at the frequency ω r, the oscillation frequency of the cantilever 104 may be shifted slightly from the frequency ω r every moment during actually scanning the MR head 102 due to a change of distance between the MR head 102 and the magnetic tip 103, for example.

The piezoelectric element for scanning 107 supports one end of the cantilever 104 and moves it three-dimensionally in order to adjust the relative position of the magnetic tip 103 against the MR head 102. That is, the piezoelectric element for scanning 107 warps according to a manipulate signal provided from the signal processing device 111 and consequently the cantilever 104 is displaced in order to scan all over the measurement surface.

In this embodiment, the piezoelectric element for scanning 107 is provided to support the cantilever 104 and control the position of the cantilever 104 via the piezoelectric element for cantilever oscillation 105. However, the piezoelectric element for scanning 107 may be disposed anywhere as long as it can adjust the relative position of the magnetic tip 103 against the MR head 102.

The deflection detection circuit 108 is provided near the end of the cantilever 104 where the magnetic tip 103 is mounted. The deflection detection circuit 108 detects the displacement of the end of the cantilever 104 resulting from the oscillation and outputs an amplitude signal based on this displacement. Although the displacement of the end of the cantilever 104 is detected in this embodiment, the displacement of the magnetic tip 103 may be detected alternatively.

Generally, the deflection detection circuit 108 has a laser source and a four-quadrant photo diode and detects the displacement by inputting a reflected laser beam into the four-quadrant photo diode. However, the deflection detection circuit 108 may have a laser source and an optical fiber and detects the displacement based on the principle of the interference of the laser beam.

The RMS/DC converter 109 is a circuit that converts an amplitude signal, namely, an amplitude of an AC signal, outputted from the deflection detection circuit 108 into DC voltage signal. The RMS/DC converter 109 supplies the DC voltage signal corresponding to the amplitude of the end of the cantilever 104 to the feedback circuit 110.

The feedback circuit 110 generates a feedback signal for controlling the piezoelectric element for scanning 107 in order to maintain the constant amplitude of the end of the cantilever 104 based on the supplied DC voltage signal. This feedback signal is supplied to the piezoelectric element for scanning 107 and also to the signal processing device 111 as an AFM signal to be used for shape property measurement of the MR head 102.

The signal processing device 111, such as a personal computer, stores signals supplied from the signal generator 106, the feedback circuit 110, and the synchronous detector 116, and processes them. The signal processing device 111 sets up an oscillation frequency and an amplitude in the signal generator 106 and a strength of a magnetic field to be generated by the coil 114. Further, the signal processing device 111 controls the warp of the piezoelectric element for scanning 107.

The magnetic tip 103, the cantilever 104, the piezoelectric element for cantilever oscillation 105, the signal generator 106, the piezoelectric element for scanning 107, the deflection detection circuit 108, the RMS/DC converter 109, and the feedback circuit 110 are called generically as a force measurement system 112.

The constant current source 113 supplies the MR head 102 with a constant current in order to obtain a value of resistance of the MR head 102 corresponding to the change of the applied magnetic field. The coil 114 applies the MR head with a DC magnetic field that changes sufficiently slower compared with the oscillation frequency of the magnetic tip 103 according to the control signal supplied from the signal processing device 111.

The AC amplifier 115 amplifies only AC component of a signal obtained from the MR head 102. The synchronous detector 116 executes synchronous detection to the output from the AC amplifier 115 using the oscillations/amplitude control signal supplied from the signal generator 106 as a reference signal.

Although the piezoelectric element for cantilever oscillation 105, the signal generator 106, the piezoelectric element for scanning 107, the deflection detection circuit 108, the RMS/DC converter 109, the feedback circuit 110, and the signal processing device 111 may be newly developed, they can be obtained by modifying existing devices or devices available in the market into the property measuring device 101. The coil 114 can be disposed anywhere as long as it can apply a magnetic field to the MR head 102.

Figure 2:
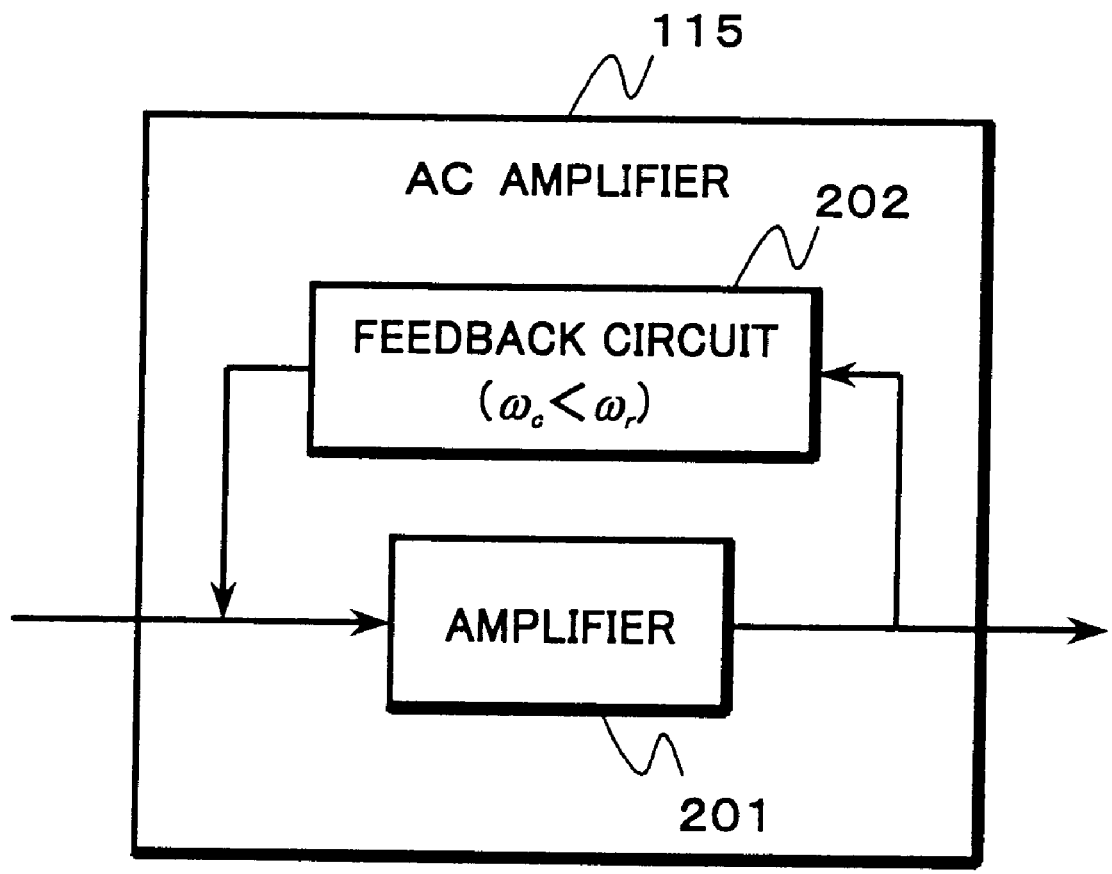
FIG. 2 is a block diagram showing an example of a configuration of an AC amplifier of the property measuring device.

FIG. 2 is a block diagram showing an example of a configuration of the AC amplifier 115. The AC amplifier 115 has an amplifier 201 and a feedback circuit 202. The output signal amplified by the AC amplifier 201 is supplied to the feed back circuit 202. Only when a cut-off frequency ω c of the AC amplifier 115 is smaller than the mechanical resonance frequency ω r of the cantilever 104, a signal is additionally supplied to the amplifier 201 from the feedback circuit 202. In this manner, the output signal from the AC amplifier 115 is sufficiently amplified.

The feedback circuit 202, of which frequency band is predetermined to be lower than the frequency ω r, removes the DC components of the output signal amplified by the amplifier 201 and amplifies only the AC components. The feedback circuit 202 may execute the operation in either the analog processor the digital process and also may employ the integral control or proportional control/differential control.

Next, the procedures for measuring the shape property and the magnetic property of the MR head 102 by the property measuring device 101 will be explained.

Figure 3:
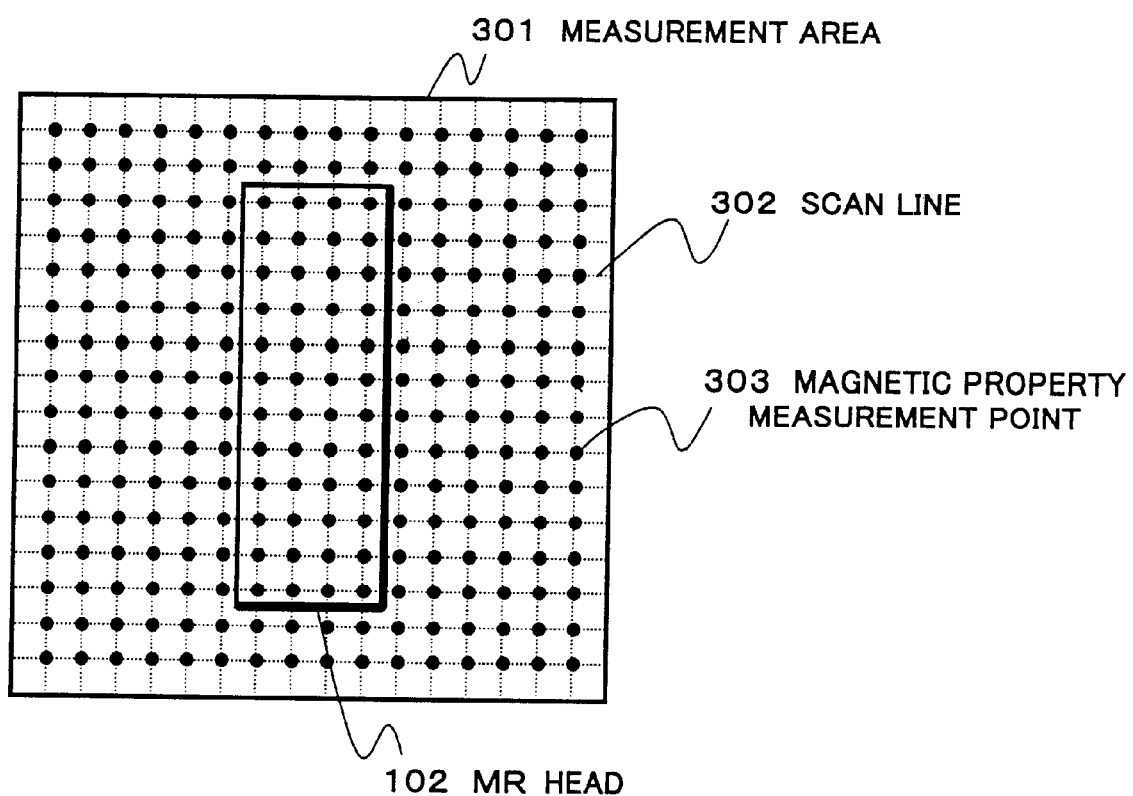
FIG. 3 is a diagram showing a measurement area against an MR head.

FIG. 3 shows the MR head 102 viewed from the normal direction to the measurement surface of the MR head 102 in order to explain the procedures for scanning and measuring the measurement surface using the magnetic tip 103. A predetermined measurement area 301 is provided on the measurement surface of the MR head 102 and its periphery. A plurality of scan lines 302 having numerous magnetic property measurement points 303 are provided in the measurement area 301. The locations of these scan lines 302 and magnetic property measurement points 303 are set up by the signal processing device 111 before the scanning.

Shape Property Measurement

In this measurement, the surface shape of the MR head 102 is measured in the same manner as a normal AFM does. That is, while the magnetic tip 103 is disposed close to the MR head 102, the signal generator 106 supplies the piezoelectric element for cantilever oscillation 105 with the oscillation frequency/amplitude signal in order to set a frequency ω almost equal to the mechanical resonance frequency ω r of the cantilever 104 and consequently the magnetic tip 103 is oscillated periodically.

The piezoelectric element for scanning 107 is driven according to the control signal provided from the signal processing device 111 and the point of the magnetic tip 103 scans the measurement surface of the MR head 102 tapping the surface along the scan lines 302. When ending the scanning along one of the scan lines 302, the magnetic tip 103 starts scanning the surface along the succeeding scan line 302 if it exists, and finally the magnetic tip 103 completes the scanning all over the measurement area 301.

The deflection detecting circuit 108 detects the displacement of the cantilever 104 in the normal direction to the measurement surface during the scanning and supplies an amplitude signal generated based on the displacement to the RMS/DC converter 109. The RMS/DC converter 109 supplies the feedback circuit 110 with a DC voltage signal corresponding to the amplitude.

The feedback circuit 110 generates the feedback signal in order to maintain the constant amplitude of the magnetic tip 103 and supplies the piezoelectric element for scanning 107 with this feedback signal. Consequently, the magnetic tip 103 scans the surface of the MR head 102 keeping its own amplitude constant. When the surface of the MR head 102 is uneven, the DC voltage signal from the RMS/DC converter 109 fluctuates and the feedback signal from the feedback circuit 110 is fluctuated corresponding to the unevenness.

This feedback signal is also provided to the signal processing device 111 as an AFM signal and stored. The signal processing device 111 generates an image of the surface shape of the MR head 102 based on this AFM signal.

Magnetic Property Measurement

While scanning the MR head 102 using the magnetic tip 103, the property measuring device 101 temporally discontinues the scanning every time the magnetic tip 103 passes one of predetermined points (hereinafter referred to as 'magnetic property measurement points 303') on the scan lines 302. And on finishing the shape property measurement on the point, the property measuring device 101 starts the magnetic property measurement.

In this measurement, the MR head 102 is applied with both a constant current from the constant current source 113 and a DC magnetic field from the coil 114. The magnetic tip 103, which oscillates at the frequency ω or a predetermined frequency on the magnetic property measuring point 303, applies a minutely oscillating magnetic field to the MR head 102. The coil 114 changes the strength of the DC magnetic field slowly.

The AC amplifier 115 measures a change of the resistance value R of the MR head 102 corresponding to the total strength H of the magnetic field applied by the magnetic tip 103 and the coil 114. The synchronous detector 116 extracts amplitude components synchronizing a fundamental frequency component ω (also referred to as 'ω component') of the frequency ω or of the above-described predetermined frequency, and also extracts amplitude components synchronizing its secondary harmonic component 2ω (also referred to as '2ω component') from the measured change of resistance value R.

During executing this measurement, the magnetic tip 103 may periodically tap the surface of the MR head 102 or, alternatively, oscillate at a predetermined height over the surface. Further, the property measuring device 101 switches the shape property measurement and the magnetic property measurement according to the signal processing device 111. This switching may be operated whenever the magnetic tip 103 arrives at the magnetic property measurement point 303 during the scanning or, alternatively, whenever the magnetic tip 103 finishes the scanning of each scan line 302.

The signal obtained by the synchronous detector 116 is analyzed by the signal processing device 111 in order to measure the signal's dependency on applied magnetic field strength. An amplitude Aω of the ω component indicates a differential value dR/dH of the resistance value R of the MR head 102 against an applied magnetic field strength H. An amplitude A2ω of the 2ω component indicates the nonlinearity of the resistance-magnetic field property. Therefore, the oscillation frequency of the magnetic tip 103 and the period of time for the change of the DC magnetic field applied by the coil 114 are required to have a relativity at a level where the differential value dR/dH can be measured.

A dR/dH-H curve shown in FIG. 4(a) is generated based on the magnetic field strength differential value dR/dH obtained in this analysis. Further, the R-H curve shown in FIG. 4(b) is obtained by integrating the dR/dH-H curve. In this manner, the property measuring device 101 executes the measurement of the local magnetic property of the MR head 102. Further, by comparing a local property at each magnetic property measurement point 303 with other points', a more detailed magnetic property measurement can be executed.

After completing the magnetic property measurement at one of the magnetic property measurement points 303, the property measuring device 101 restarts the discontinued scanning in order to continue the shape property measurement.

Further, information on the inside of the MR head 102, such as a defect, can be obtained by using the computer tomography (CT) after executing the above-described magnetic property measurement under numerous conditions for the relative distance between the MR head 102 and the magnetic tip 103.

As described above, according to this embodiment, it is possible to measure the local magnetic property of the MR head 102 by measuring the amplitude A1ω and A2ω of the ω component and 2ω component. The word 'local' referred to above may equal to the resolution level of AFM, which is the basic technology of the present invention.

Further, the problem of a low Q factor of a reference signal in the prior art can be solved because the synchronous detector 116 uses the frequency/amplitude setting signal supplied from the signal generator 106 as the reference signal for the synchronous detection.

The magnetic property is measured at magnetic property measurement points 303 on the scan line 302 at the same time that the shape property is measured. Therefore, the magnetic property measurement can be executed without shifting of the measurement position due to the thermal drift of the whole scanning system.

Although the present invention is explained by exemplifying an embodiment employing the MR head as a matter to be measured, the present invention is applicable to every magneto-resistance effect element, such as, spin valve head, ferromagnetic tunneling head, giant MR head, super lattice head.

What is claimed is:

1. A device for measuring a magnetic property of a magnetic reproducing head at a measurement point thereon, comprising:

means for applying a first magnetic field which oscillates at a predetermined oscillation frequency to the measurement point;

means for applying a second magnetic field of which strength changes slower compared with the oscillation frequency of the first magnetic field to the measurement point;

means for detecting a signal generated by the magnetic reproducing head according to the total strength of the first magnetic field and the second magnetic field; and means for measuring the signal's dependency on applied magnetic field strength, wherein the measuring means comprises means for extracting amplitude components synchronizing with the oscillation frequency from the signal; and means for calculating changes of the signal against the total magnetic field strength based on the extracted amplitude components; and wherein the extracting means extracts amplitude components synchronizing with double the oscillation frequency from the signal.

2. The device of claim 1, further comprising:

means for applying a constant electric current to the magnetic reproducing head; wherein:

the detecting means detects a value of resistance of the magnetic reproducing head changing with the total magnetic field strength;

the extracting means extracts amplitude components synchronizing with the oscillation frequency from the resistance value of the magnetic reproducing head; and the calculating means calculates changes of the resistance value of the magnetic reproducing head against the total magnetic field strength based on the extracted amplitude components.

3. The device of claim 2, further comprising:

means for calculating a resistance/magnetic field strength characteristics based on the changes of the resistance value of the magnetic reproducing head against the total magnetic field strength.

4. A device for measuring a magnetic property of a magnetic reproducing head at a measurement point thereon, comprising:

means for applying a first magnetic field which oscillates at a predetermined oscillation frequency to the measurement point;

means for applying a second magnetic field of which strength changes slower compared with the oscillation frequency of the first magnetic field to the measurement point;

means for detecting a signal generated by the magnetic reproducing head according to the total strength of the first magnetic field and the second magnetic field;

means for measuring the signal's dependency on applied magnetic field strength; and means for providing the oscillation frequency to the first magnetic field applying means and the extracting means;

wherein the measuring means comprises means for extracting amplitude components synchronizing with the oscillation frequency from the signal; and means for calculating changes of the signal against the total magnetic field strength based on the extracted amplitude components; and wherein the first magnetic field applying means oscillates the first magnetic field at the oscillation frequency; and the extracting means extracts the amplitude components synchronizing with the provided oscillation frequency from the signal.

5. The device of claim 4, further comprising:

means for applying a constant electric current to the magnetic reproducing head; wherein:

the detecting means detects a value of resistance of the magnetic reproducing head changing with the total magnetic field strength;

the extracting means extracts amplitude components synchronizing with the oscillation frequency from the resistance value of the magnetic reproducing head; and the calculating means calculates changes of the resistance value of the magnetic reproducing head against the total magnetic field strength based on the extracted amplitude components.

6. The device of claim 5, further comprising:

means for calculating a resistance/magnetic field strength characteristics based on the changes of the resistance value of the magnetic reproducing head against the total magnetic field strength.

7. A device for measuring a magnetic property of a magnetic reproducing head at a measurement point thereon, comprising:

means for applying a first magnetic field which oscillates at a predetermined oscillation frequency to the measurement point;

means for applying a second magnetic field of which strength changes slower compared with the oscillation frequency of the first magnetic field to the measurement point;

means for detecting a signal generated by the magnetic reproducing head according to the total strength of the first magnetic field and the second magnetic field; and means for measuring the signal's dependency on applied magnetic field strength, wherein the measuring means comprises means for extracting amplitude components synchronizing with the oscillation frequency from the signal; and means for calculating changes of the signal against the total magnetic field strength based on the extracted amplitude components; and wherein the first magnetic field applying means comprises a magnetic tip; and means for oscillating the magnetic tip at the oscillation frequency.

8. The device of claim 7, further comprising:

means for applying a constant electric current to the magnetic reproducing head; wherein:

the detecting means detects a value of resistance of the magnetic reproducing head changing with the total magnetic field strength;

the extracting means extracts amplitude components synchronizing with the oscillation frequency from the resistance value of the magnetic reproducing head; and the calculating means calculates changes of the resistance value of the magnetic reproducing head against the total magnetic field strength based on the extracted amplitude components.

9. The device of claim 8, further comprising:

means for calculating a resistance/magnetic field strength characteristics based on the changes of the resistance value of the magnetic reproducing head against the total magnetic field strength.

10. A device for measuring a magnetic property of a magnetic reproducing head at a measurement point thereon, comprising:

means for applying a first magnetic field which oscillates at a predetermined oscillation frequency to the measurement point;

means for applying a second magnetic field of which strength changes slower compared with the oscillation frequency of the first magnetic field to the measurement point;

means for detecting a signal generated by the magnetic reproducing head according to the total strength of the first magnetic field and the second magnetic field; and means for measuring the signal's dependency on applied magnetic field strength, wherein the measuring means comprises means for extracting amplitude components synchronizing with the oscillation frequency from the signal; and means for calculating changes of the signal against the total magnetic field strength based on the extracted amplitude components;

wherein the first magnetic field applying means comprises a magnetic tip; and means for oscillating the magnetic tip at the oscillation frequency; and wherein the oscillating means comprises a piezoelectric element, which warps according to a provided electric current, for generating an oscillation; means for providing the piezoelectric element with an electric current oscillating at the oscillation frequency; and a cantilever which conducts the oscillation from the piezoelectric element to the magnetic tip.

11. The device of claim 10, further comprising:

means for applying a constant electric current to the magnetic reproducing head; wherein:

the detecting means detects a value of resistance of the magnetic reproducing head changing with the total magnetic field strength;

the extracting means extracts amplitude components synchronizing with the oscillation frequency from the resistance value of the magnetic reproducing head; and the calculating means calculates changes of the resistance value of the magnetic reproducing head against the total magnetic field strength based on the extracted amplitude components.

12. The device of claim 11, further comprising:

means for calculating a resistance/magnetic field strength characteristics based on the changes of the resistance value of the magnetic reproducing head against the total magnetic field strength.

13. A device for measuring a magnetic property of a magnetic reproducing head at a measurement point thereon, comprising:

means for applying a first magnetic field which oscillates at a predetermined oscillation frequency to the measurement point;

means for applying a second magnetic field of which strength changes slower compared with the oscillation frequency of the first magnetic field to the measurement point;

means for detecting a signal generated by the magnetic reproducing head according to the total strength of the first magnetic field and the second magnetic field; and means for measuring the signal's dependency on applied magnetic field strength, wherein the measuring means comprises means for extracting amplitude components synchronizing with the oscillation frequency from the signal; and means for calculating changes of the signal against the total magnetic field strength based on the extracted amplitude components;

wherein the first magnetic field applying means comprises a magnetic tip; and means for oscillating the magnetic tip at the oscillation frequency; and means for adjusting a distance between the magnetic reproducing head and the magnetic tip to a predetermined distance.

14. The device of claim 13, further comprising:

means for applying a constant electric current to the magnetic reproducing head; wherein:

the detecting means detects a value of resistance of the magnetic reproducing head changing with the total magnetic field strength;

the extracting means extracts amplitude components synchronizing with the oscillation frequency from the resistance value of the magnetic reproducing head; and the calculating means calculates changes of the resistance value of the magnetic reproducing head against the total magnetic field strength based on the extracted amplitude components.

15. The device of claim 14, further comprising:

means for calculating a resistance/magnetic field strength characteristics based on the changes of the resistance value of the magnetic reproducing head against the total magnetic field strength.

16. A device for measuring both a shape property of a measurement surface of a magnetic reproducing head and a magnetic property on a measurement point within the measurement surface, comprising:

a probe at least a part of which is made of a magnetic substance;

means for oscillating the probe at a predetermined amplitude in the normal direction to the measurement surface;

means for moving the oscillating probe tapping the magnetic reproducing head on the measurement surface at the predetermined amplitude, and discontinuing the moving when the probe is located at the measurement point;

means for detecting the probe's displacement in the normal direction to the measurement surface;

means for measuring the shape property of the measurement surface based on the probe's displacement detected during the moving;

means for applying a magnetic field of which strength changes slower compared with the oscillation frequency of the probe to the measurement surface while the moving is discontinued;

means for detecting a signal generated by the magnetic reproducing head according to the total strength of the magnetic field both by the magnetic field applying means and by the probe while the moving is discontinued;

means for extracting amplitude components synchronizing with the oscillation frequency from the signal; and means for calculating changes of the signal against the total magnetic field strength based on the extracted amplitude components.

17. The device of claim 16, wherein:

the extracting means extracts amplitude components synchronizing with double the oscillation frequency from the signal.

18. The device of claim 16, further comprising:

means for providing the oscillation frequency to the magnetic field applying means and the extracting means; and wherein:

the magnetic field applying means oscillates the magnetic field at the oscillation frequency; and the extracting means extracts the amplitude components synchronizing with the provided oscillation frequency from the signal.

19. The device of claim 16, wherein the oscillating means comprises:

a piezoelectric element, which warps according to a provided electric current, for generating an oscillation;

means for providing the piezoelectric element with an electric current oscillating at the oscillation frequency; and a cantilever which conducts the oscillation from the piezoelectric element to the magnetic tip.

20. The device of claim 16, further comprising:

means for applying a constant electric current to the magnetic reproducing head; wherein:

the detecting means detects a value of resistance of the magnetic reproducing head changing with the total magnetic field strength;

the extracting means extracts amplitude components synchronizing with the oscillation frequency from the resistance value of the magnetic reproducing head; and the calculating means calculates changes of the resistance value of the magnetic reproducing head against the total magnetic field strength based on the extracted amplitude components.

21. The device of claim 20, further comprising:

means for calculating a resistance/magnetic field strength characteristics based on the changes of the resistance value of the magnetic reproducing head against the total magnetic field strength.

22. A method for measuring a magnetic property of a magnetic reproducing head at a measurement point thereon, comprising:

applying a first magnetic field which oscillates at a predetermined oscillation frequency to the measurement point;

applying a second magnetic field to the measurement point;

changing the strength of the second magnetic field slower compared with the oscillation frequency of the first magnetic field;

detecting a signal generated by the magnetic reproducing head according to the total strength of the first magnetic field and the second magnetic field;

measuring the signal's dependency on applied magnetic field strength; and extracting amplitude components synchronizing with double the oscillation frequency from the signal;

wherein the measuring comprises extracting amplitude components synchronizing with the oscillation frequency from the signal; and calculating changes of the signal against the total magnetic field strength based on the extracted amplitude components.

23. The method of claim 22, further comprising:

applying a constant electric current to the magnetic reproducing head; wherein:

the detecting includes detecting a value of resistance of the magnetic reproducing head changing with the total magnetic field strength;

the extracting includes extracting amplitude components synchronizing with the oscillation frequency from the resistance value of the magnetic reproducing head; and the calculating includes calculating chances of the resistance value of the magnetic reproducing head against the total magnetic field strength based on the extracted amplitude components.

24. The method of claim 23, further comprising:

calculating a resistance/magnetic field strength characteristics based on the changes of the resistance value of the magnetic reproducing head against the total magnetic field strength.

25. A method for measuring both a shape property of a measurement surface of a magnetic reproducing head and a magnetic property on a measurement point within the measurement surface, comprising:

oscillating a probe at least a part of which is made of a magnetic substance at a predetermined amplitude in the normal direction to the measurement surface;

moving the oscillating probe tapping on the magnetic reproducing head on the measurement surface at the predetermined amplitude;

discontinuing the moving when the probe is located at the measurement point;

detecting the probe's displacement in the normal direction to the measurement surface;

measuring the shape property of the measurement surface based on the probe's displacement detected during the moving;

applying a magnetic field to the magnetic reproducing head while the moving is discontinued;

changing the strength of the magnetic field slower compared with the oscillation frequency of the probe;

detecting a signal generated by the magnetic reproducing head according to the total strength of the magnetic field applied to the head;

extracting amplitude components synchronizing with the oscillation frequency from the signal; and calculating changes of the signal against the total magnetic field strength based on the extracted amplitude components.

26. The method of claim 25, further comprising:

extracting amplitude components synchronizing with double the oscillation frequency from the signal.

27. The method of claim 25, further comprising:

applying a constant electric current to the magnetic reproducing head; wherein:

the detecting includes detecting a value of resistance of the magnetic reproducing head changing with the total magnetic field strength;

the extracting includes extracting amplitude components synchronizing with the oscillation frequency from the resistance value of the magnetic reproducing head; and the calculating includes calculating changes of the resistance value of the magnetic reproducing head against the total magnetic field strength based on the extracted amplitude components.

28. The method of claim 27, further comprising:

calculating a resistance/magnetic field strength characteristics based on the changes of the resistance value of the magnetic reproducing head against the total magnetic field strength.

* * * * *